May 19, 1970     A. THALMANN     3,512,401

METHOD OF COUPLING ULTRASOUND INTO HOT METAL

Filed July 14, 1967

INVENTOR.
ARMIN THALMANN

ATTORNEYS 3,512,401
METHOD OF COUPLING ULTRASOUND INTO
HOT METAL
Armin Thalmann, Uster, Switzerland, assignor to Concast AG, Zurich, Switzerland, a Swiss company
Filed July 14, 1967, Ser. No. 653,486
Claims priority, application Switzerland, July 14, 1966, 10,253/66
Int. Cl. G01n 9/24
U.S. Cl. 73—67.7                              5 Claims

ABSTRACT OF THE DISCLOSURE

An ultrasonic transducer is coupled to a hot body such as a continuous casting by introducing turbulent water flow as the coupling medium. The turbulent flow penetrates the steam barrier and the fluid couples the ultrasonic vibrations.

---

Figure 1:
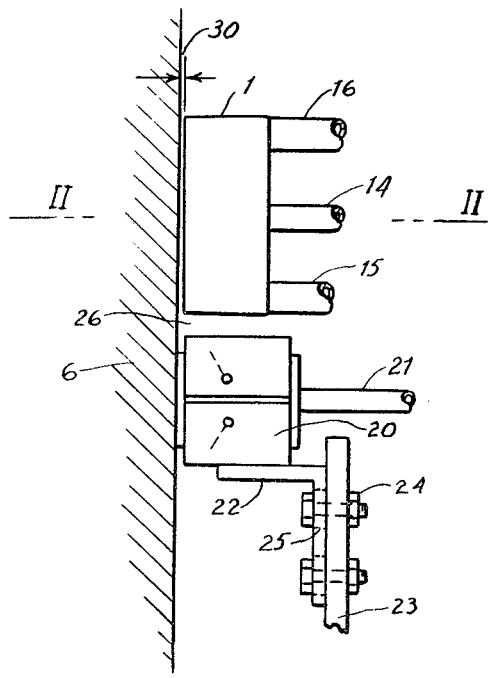

The invention relates to a method of and apparatus for coupling ultrasound into hot metals, particularly during continuous casting, comprising producing relative movement between the hot metal and an ultrasonic transducer head and precooling the surface of the hot metal.

It is extremely desirable that the applicability of the technique of ultrasonic inspection of hot metals should be extended to embrace metals at higher temperatures, for example temperatures up to approximately 1100° C., but considerable difficulties arise in coupling the ultrasound into the hot metal. Since even a thin layer of gas acts as a barrier by reflecting most of the ultrasound it is generally necessary to provide a special liquid couplant between the transducer and the metal for transmitting the waves into the metal. However, a hot metal surface either quickly causes a liquid couplant, such as water, on oil or the like, to boil or the couplant may fail to wet the metal surface sufficiently, for instance when a salt or metal melt is employed as the couplant. The evolution of vapor between the surface of the hot metal and the liquid couplant stops the transmission of the ultrasound. Direct coupling is impossible because ultrasonic transducers are temperature sensitive.

It has already been proposed to cool a hot metal by precooling its surface sufficiently to permit water to be used as the couplant. For instance, in one method known in the art of ultrasonically testing sheet metal and slabs, precooling is effected by an immersion wheel, whereby the metal to be ultrasonically tested is entirely immersed into water, followed by spraying the surface with water. However, this method of precooling is open to the objection that there is a risk of cracks being formed by the rapid quenching of the entire metal body, that the apparatus occupies considerable space and that large volumes of water are needed.

Another known arrangement for coupling in ultrasound is likewise equipped with precooling means, a layer of water being applied to the metal directly in front of the ultrasonic transducer head. However, for testing metals at higher temperatures the effect of this method of precooling is insufficient because Leidenfrost's phenomenon lends to the formation of a steam cushion between the hot metal and the layer of coolant. This cushion of steam hinders the transfer of heat from the metal to the coolant and at the same time it prevents the ultrasound from entering the metal. Moreover, this method of precooling the metal directly facing the test head considerably reduces the transmission of ultrasound because of the turbulence created under the transducer head, and the method has proved to be useless for the inspection of hot metals.

Furthermore, for continuous casting it has been proposed to couple the ultrasound into the moving metal casting by means of a water jet. However, it has been found that at elevated temperatures of the casting one or more water jets forming a precooling zone are not sufficient to eliminate the steam cushion which forms on the surface of the hot metal, notwithstanding the employment of high water pressures and large water volumes, and thus that the ultrasound cannot be coupled into the metal. On the other hand, any extension of the precooling zone leads to the formation of cracks because the longer duration of the cooling effect cools to too great a depth and thus promotes cracking.

It is the object of the present invention so intensely to cool a thin layer of the surface of the hot metal by a short period cooling effect with a low expenditure of coolant and at low pressure that ultrasound can be coupled into the metal.

In the method according to the present invention this is achieved by providing relative movement between an ultrasonic transducer head and the hot metal, precooling the surface of the hot metal by introducing a coolant into a clearance gap between the hot metal and at least one cooling body and adjusting the pressure drop of the coolant in the gap to generate turbulent flow of coolant in the gap causing the coolant to penetrate into the cushion of steam which forms on the surface of the hot metal and by intense contact with the steam of the cushion to extract heat from the steam and hence from the surface of the metal sufficiently to permit the ultrasound to be coupled into the metal, and then coupling the ultrasound into the precooled metal.

Apparatus for performing the method comprises an ultrasonic transducer head and an associated cooling body adapted to be positioned in proximity to the surface of the hot metal for relative movement to occur between the transducer and the cooling body on the one hand and the surface of the hot metal on the other hand, and means in said cooling body to admit a coolant into the clearance gap between the hot metal and the cooling body, whereby to generate turbulent flow of coolant in the gap and precool, the surface of the hot metal to a temperature at which ultrasonic waves generated in said transducer may couple into the metal.

This method of precooling with a cooling body or bodies provides a sufficiently intense cooling effect to permit hot metal at temperatures even exceeding 1000° C. to be so cooled in the region near the surface that no thermal stresses leading to the formation of cracks are generated thereby. Another advantage is that the consumption of coolant is low.

Figure 2:
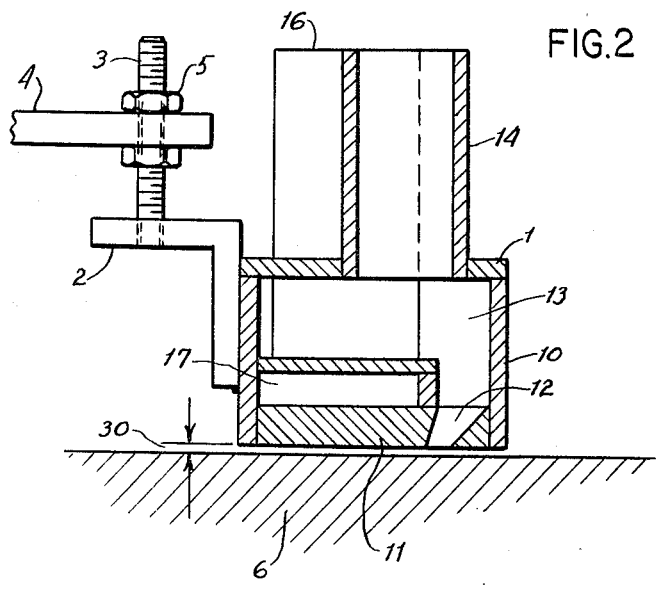

The invention and other features thereof will be better understood from the following particular description made with reference to the accompanying drawings, in which:

FIG. 1 illustrates schematically the construction of the proposed apparatus comprising a precooling zone and an ultrasonic transducer head, and FIG. 2 is a section taken on the line II—II in FIG. 1.

A cooling body 1 defines a precooling zone. The cooling body 1 is attached to a bracket 2. This bracket 2 is fitted with bolts 3 for securing the same to a holder 4 connected to a support structure not shown in the drawing. Nuts 5 permit the bracket 2 and hence the cooling body 1 to be so adjusted that a clearance 30 remains between the cooling body 1 and a moving hot metal casting 6, for instance a continuous casting.

The cooling body 1 comprises a casting 10 to which a cooling plate 11, preferably of copper, is attached. This plate 11 is provided with outlet openings 12. If the cooling body 1 is narrow these openings 12 are preferably located towards one side of the body and placed at an angle to impart a direction of flow to the issuing coolant that will improve the cooling effect. The outlet openings 12 communicate with a chamber 13 within the body 1 and to which is connected a coolant inlet 14.

For cooling the plate 11, a narrow flow chamber 17 is formed inside the cooling body 1 and provided with an inlet 15 and an outlet 16 for a coolant. However, it is not always necessary thus to cool the plate 11 from the back and this arrangement may be dispensed with if the intensity of cooling is otherwise already sufficient.

For cooling the hot metal a coolant, preferably water, is admitted through the inlet 14. This water issues from the outlet opening 12 and enters the clearance gap 30. The width of the gap 30 which is determined by irregularities of the metal surface of the casting 6 and of the plate 11 is adjusted to a controllably variable distance in the order of say 0.5 mm. The water may enter the clearance gap at a pressure between 0.1 and 7 atg. The above-metioned irregularities generate turbulent flow in the gap 30 and this favours penetration of the coolant into the cushion of steam due to Leidenfrost's phenomenon and promotes the desired extraction of heat from the steam. In other words, the turbulent particles of water penetrate into the cushion of steam and extract heat from the steam and hence from the hot surface of the casting 6 principally by convection.

Moreover, owing to their turbulence the individual coolant particles which have a raised content of heat are brought into repeated intimate contact with the cooled plate 11 so that the evolution of steam by the individual particles when they next accept heat from the cushion of steam is retarded. The turbulence thus causes the individual particles to move to and fro between the metal surface and the cooling body and they thus operate to convey heat from the metal surface to the cooling body.

However, it is impossible to prevent the temperature of the particles from rising as they move to and fro in the gap and there will therefore nevertheless be a gradual evolution of steam. In order to allow for this fact the width—measured across the direction of relative movement—of the cooling body is limited to permit the water to escape before it can form any harmful volume of steam. Alternatively, if several wide cooling bodies are provided in tandem their individual lengths—measured in the direction of relative movement—are so chosen that the considerably heated coolant can escape between the cooling bodies.

Following the cooling body and separated therefrom by a gap 26 there is provided an ultrasonic transducer head 20, for instance comprising a transmitting and a receiving transducer. For coupling in the ultrasound the head is provided with an admission pipe 21 for water. The transducer head 20 is attached to a bracket 22 which is itself affixed by bolts 24 to a holder 23 connected to the support structure. The bracket 22 contains slots 25 which permit the distance 26 between the cooling body 1 and the transducer head 20 in the direction of movement of the hot metal casting 6 to be adjusted. By making this adjustment the coupling point can be exactly selected before the thin, highly cooled surface layer of hot metal has become too hot to permit the ultrasound to be coupled in. Moreover, by spacing the transducer head away from the cooling body in order to create the gap 26, the coolant is given an opportunity of escaping from the clearance gap 30 and from the head 20 and thereby to retard any undesirable evolution of steam, as has been explained.

If water is used as the couplant for the ultrasound the intensity of precooling is so chosen that the surface temperature of the hot metal is less than 125° C. where coupling takes place, since below this temperature no significant amount of steam would prevent the transmission of the ultrasonic waves.

Since the amount of heat extracted, i.e., the cooling effect, is a function of the pressure drop in the clearance gap 30 it can be varied not only by controlling the coolant pressure but also by adjusting the width of the clearance gap by means of the bolts 3. Widening of the gap 30 reduces the turbulence. Consequently, penetration of the cushion of steam by the particles of water is reduced and the cooling effect is lowered accordingly. A change equivalent to a change in gap width also results from any modification of the nature of the surface of the plate 11 facing the hot metal, for instance by roughening the same, since the roughness of this suface also changes the degree of turbulence that is achieved.

An increase in turbulence and hence of the intensity of the cooling effect is also achieved if the direction of flow of the cooling liquid is arranged to be contrary to the direction of motion of the hot metal 6.

In order to convey the precooled surface of the metal under the transducer head where the ultrasound is coupled into the metal, there must naturally be relative motion between the surface and the transducer head. In the above description the cooling body and the transducer head are both firmly attached to the support surface, whereas the hot metal moves. However, the present invention can also be used in cases in which the hot metal remains stationary and to obtain the necessary relative motion the transducer head together with its associated precooling body were arranged to move.

Nor is the scope of the invention intended to be restricted to the particular arrangement that has been described. For instance, for accurately maintaining the width of the clearance gap when the metal surface is irregular rollers could be provided to precede and follow the cooling body and the latter be rigidly connected to the roller bearings to move in and out in accordance with the surface irregularities. The roller bearings would be spring loaded to permit the rollers to adjust themselves to irregularities of the metal surface.

What we claim is:

1. A method of coupling ultrasound into hot metals that are at temperatures up to approximately 1100° C., comprising providing relative movement between an ultrasonic transducer head and a surface portion of the hot metal, precooling said surface portion of the hot metal by circulating a liquid coolant through a first clearance gap between said surface portion of the hot metal and at least one cooling body, generating a turbulent flow of the coolant in said first gap causing liquid coolant to penetrate into the cushion of steam which forms on said surface portion of the hot metal and by intense contact with the steam of the cushion to extract heat from the steam and hence from said surface portion of the metal, coupling the transducer head to said precooled surface portion of the metal by spacing the transducer head therefrom to form a second clearance gap therebetween and circulating a couplant liquid through said gap, adjustably spacing the transducer head from said cooling body to provide a third gap between them for the escape of said liquids from said first and second gaps, and adjusting the turbulence in the first gap and the width of the third gap for adjusting the amount of the cooling of the surface portion of the hot metal moving relatively past the transducer head for enabling the ultrasound to be coupled into the metal through said couplant liquid.

2. A method according to claim 1, wherein the width of the first clearance gap between the cooling body and the surface portion of the hot metal that is to be cooled is varied for the purpose of controlling the turbulence of the coolant and the consequent cooling effect on the hot metal.

3. A method according to claim 2, wherein the width of said first clearance gap is varied by altering the nature of the surface of the cooling body which faces the hot metal surface that is to be cooled.

4. A method according to claim 1, wherein the cooling body is cooled by a coolant which flows through a flow chamber in its interior.

5. A method according to claim 1, wherein the coolant is water and for coupling in the ultrasound the surface of the hot metal is cooled to temperature below about 125° C.

References Cited

UNITED STATES PATENTS 3,237,251   3/1966   Thalmann _____ 164—4
3,303,691   2/1967   Beaujard et al. _____ 73—71.5
3,399,716   9/1968   Rossi et al. _____ 164—89

J. SPENCER OVERHOLSER, Primary Examiner

R. S. ANNEAR, Assistant Examiner

U.S. Cl. X.R.

73—71.5; 164—4, 49, 154